United States Patent [19] [11] Patent Number: 4,737,635
Uchida [45] Date of Patent: Apr. 12, 1988

[54] OPTICAL ROTARY ENCODER WITH ADJUSTABLY POSITIONED LIGHT SOURCE

[75] Inventor: Hiroyuki Uchida, Hachioji, Japan
[73] Assignee: Fanuc Ltd., Yamanashi, Japan
[21] Appl. No.: 881,356
[22] PCT Filed: Oct. 18, 1985
[86] PCT No.: PCT/JP85/00584
§ 371 Date: Jun. 18, 1986
§ 102(e) Date: Jun. 18, 1986
[87] PCT Pub. No.: WO86/02441
PCT Pub. Date: Apr. 24, 1986

[30] Foreign Application Priority Data
Oct. 19, 1984 [JP] Japan .................. 59-218676

[51] Int. Cl.⁴ .............................. G01D 5/34
[52] U.S. Cl. .................... 250/231 SE; 250/237 G
[58] Field of Search .................. 250/231 SE, 237 G; 356/395; 340/347 P; 324/175

[56] References Cited
U.S. PATENT DOCUMENTS
3,902,063  8/1975  Oelsch et al. ............ 250/578
4,031,441  6/1977  Garrett ................. 250/231 SE
4,512,184  4/1985  Ernst et al. ............ 250/231 SE Primary Examiner—David C. Nelms
Assistant Examiner—Michael Messinger
Attorney, Agent, or Firm—Armstrong, Nikaido, Marmelstein & Kubovcik

[57] ABSTRACT

An optical rotary encoder converts a rotational angle of a shaft (13) rotatably supported in a base member of flange (11) into an output of an electrical digital quantity. A light-receiving system (18) including at least one photoelectric conversion element is fixed to a certain place on the flange (11). A stationary encoding plate (19) having a certain light-transmitting pattern is fixed to the flange so as to face the light-receiving surface of the light-receiving system. A rotary encoding plate (15) having a certain light-transmitting pattern is fixed to the shaft so as to be in opposition to the stationary encoding plate. A light-source support member (20) is arranged rotatably about the axis of the shaft with respect to the flange. A light source having light-emitting elements (22, 23; 123, 223) is attached to the light-source support member so as to be in opposition to the rotary encoding plate. The light-source support member is fixed to the flange by a fixing element (25) after a positional adjustment thereof is performed. The light-source support member may include two individually adjustable members each supporting a light-emitting element.

8 Claims, 3 Drawing Sheets

OPTICAL ROTARY ENCODER WITH ADJUSTABLY POSITIONED LIGHT SOURCE

DESCRIPTION

1. Technical Field

The present invention relates to an optical rotary encoder, and more particularly, to an optical rotary encoder for converting a rotational angle of a shaft rotatably supported in a base member or flange into an output of an electrical digital quantity.

2. Background Art

Generally, in low resolution type optical rotary encoders with an output of about several hundred pulses (for example, 200) per one revolution, wide use is made of a structure in which a light source such as a light-emitting diode (LED), a laser-beam projector or the like is attached to and positioned mechanically at a predetermined location with respect to a light-receiving system including a light-detecting element, i.e., a photoelectric conversion element such as a photodiode, a photoconductor or the like. In the case of such an attaching structure, since an attaching position for the light source is univocally fixed, the work for attachment thereof is easy and can be automated. However, since the position of the light source cannot be adjusted, the reliability of the encoders decreases upon variations in the orientation of the light source, the dimensional precision of component parts, etc. Therefore, such an attaching structure is not suitable for high resolution rotary encoders.

In a high resolution optical rotary encoder with an output of several thousand pulses (for example, 2000) or more, wide use is made of a method of adjusting the three-dimensional position of the light source by hand, to obtain the optimal output waveform of an photoelectric conversion system, then fixing the light source to a fixed support by an adhesive. However, in the case of using such a method, the direction of the adjustment of the position of the light source is not defined, so adjustment is not made by set amounts, which factor results in the disadvantage that a certain time must be taken for the adjustment. Further, since such a non-set manual adjustment is required, it is difficult to automatically assemble the encoders.

DISCLOSURE OF THE INVENTION

According to the present invention, there is provided an optical rotary encoder for converting a rotational angle of a shaft rotatably supported in a base member into an output of an electrical digital quantity, comprising: a light-receiving system fixed to a certain place of the base member; a stationary encoding plate fixed to the base member so as to face the light-receiving surface of the light-receiving system; a rotary encoding plate fixed to the shaft so as to be in opposition to the stationary encoding plate; a light-source support member arranged rotatably about the axis of the shaft with respect to the base member; a light source attached to the light-source support member so as to be in opposition to the rotary encoding plate; and a fixing means for fixing the light-source support member to the base member.

In the above-mentioned encoder, the location of the light source in relation to the light-receiving system can be easily performed by adjusting the position of the light-source support member in the rotating direction thereof. That is, in the first place, the rotary encoding plate is matched in position with the stationary encoding plate, and then the light-source support member is matched in place with the base member in the rotating direction thereof. The light-source support member is then fixed to the base member by means of the fixing means at the position where the waveform of the output from the light-receiving system is optimal. In this way, since the light-source support member supporting the light source can only rotate about the axis of the shaft, the adjustment of the position of the light source can be performed easily by set amounts, thus enabling automation of the assembly of the encoder and adjustment work for the light source. Consequently, it is possible to easily manufacture high resolution type optical rotary encoders.

In a preferred embodiment of the present invention, the light-receiving system includes at least a pair of light-detecting elements, i.e., photoelectric conversion elements, arranged and spaced from each other by a certain distance in the circumferential direction of the shaft, and the light source includes at least a pair of light-emitting elements opposite to the light-detecting elements, respectively. In this case, the light-emitting elements may be spaced from each other by a certain distance in the circumferential direction of the shaft and fixed to a single light-source support member. The light-emitting elements, however, may be fixed to a pair of inner and outer light-source support members, respectively, so that the positions of the light-emitting elements can be adjusted individually. This modification makes possible not only individual adjustments of the photoelectric conversion outputs of the different phases, corresponding to the light-emitting elements, but also adjustment of the positional relationship among the phases.

The above-described and other features and advantages of the present invention will become more apparent from the following detailed description with reference to the attached drawings.

BEST MODE FOR CARRYING OUT THE INVENTION

Figure 1:
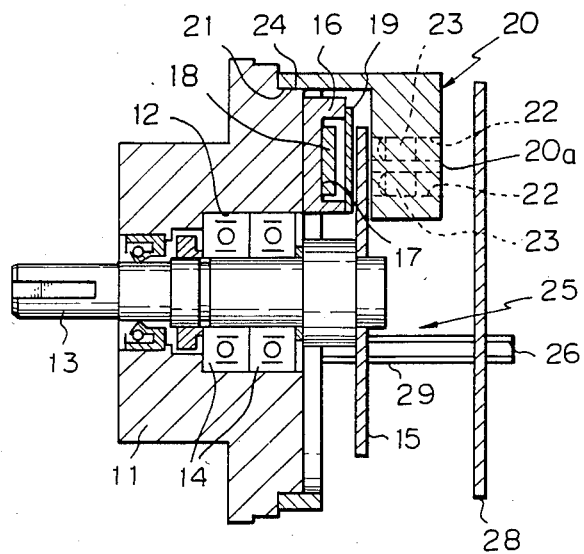
FIG. 1 is a longitudinal sectional view of an optical rotary encoder illustrating a first embodiment according to the present invention.
Figure 2:
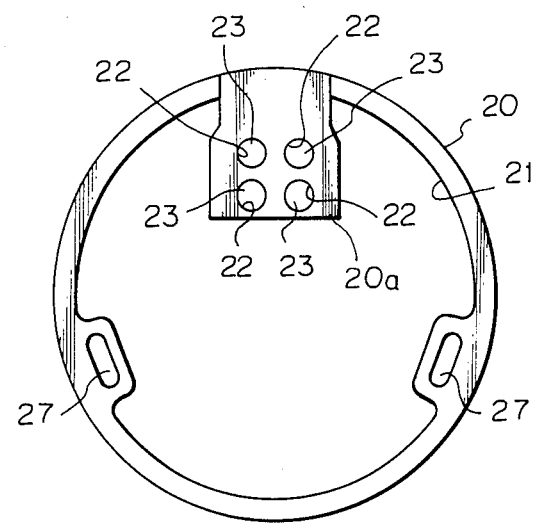
FIG. 2 is a front view of a light-source support member in the encoder shown in FIG. 1.

FIGS. 1 and 2 show a first embodiment according to the present invention. Referring to these Figures, an optical rotary encoder comprises a disk-shaped base member, i.e., a flange 11. The flange has at its center a cylindrical bearing bore 12. A shaft 13 passing through the flange 11 is rotatably supported to a bearing 14 arranged in the bearing bore 12 of the flange. When the rotary encoder is applied, for example, to the servo motor (not shown), the flange 11 is attached to the housing of the servo motor and the shaft 13 is connected to the output shaft of the servo motor.

The shaft 13 has fixed thereto a rotary encoding plate 15 which is formed with a predetermined light-transmitting pattern (not shown) by means of a mask evaporation or the like.

A mount 16 having an endface opposite to the rotary encoding plate 15 and a concavity 17 provided in the endface is positioned at a predetermined location in the endface of the flange 11 and fixed thereto by means of a screw, an adhesive or the like. In the bottom portion of the concavity 17 of the mount 16, a light-receiving system 18 having a photoelectric conversion element, i.e., a light-detecting element (not shown) such as a photodiode, a photoconductor or the like is positioned at a predetermined location and fixed to the mount 16 by means of a screw, an adhesive or the like. A stationary encoding plate 19 is positioned at a predetermined location on the endface of the mount 16 and fixed thereto by means of an adhesive or the like. The stationary encoding plate 19 is formed with a predetermined light-transmitting pattern (not shown) by means of a mask evaporation or the like.

The rotary encoder comprises an annular light-source support member 20 which has an inner cylindrical fitting face 21. The light-source support member 20 is provided with a arm portion 20a extending inward in the radial direction thereof. The arm portion 20a is formed with fitting holes 22. Two pair of light-emitting diodes 23 as a light source are inserted into the fitting holes 22, respectively, and fixed to the arm portion by means of an adhesive or the like.

The flange 11 has an outer cylindrical fitting face 24 which is coaxial with the bearing bore 12 and fittable to the fitting face 21 of the light-source support member 20. Therefore, the light-source support member 20 is positioned in the radial direction with respect to the shaft 13 upon the fitting engagement of the fitting faces 21 and 24, but is movable in the circumferential direction along the fitting face 24 of the flange 11.

The rotary encoder comprises a fixing means 25 for fixing the light-source support member 20 to the flange 11. In this embodiment, the fixing means 25 includes tightening bolts 26. The light-source support member 20 is formed with elongated holes 27 extending in the circumferential direction of the shaft 13. The tightening bolt 26 passes through the corresponding elongated hole 27 of the light-source support member 20 and is screwed into a threaded hole (not shown) formed in the flange 11. The bolt 26 supports a printed circuit board 28 on which electric circuits connected to the light-emitting diodes 23 and the light-receiving system 18 are provided. A spacer 29 is inserted between the printed circuit board 28 and the light-source support member 20. As the fixing means, an adhesive also may be used.

In the above-described optical rotary encoder, when performing the adjustment of the position of the light-emitting diode 23 in relation to the light-receiving system 18, the light-transmitting patterns of the rotary encoding plate 15 and the stationary encoding plate 19 are matched in position, and then the shaft 13 is fixed to the flange 11. Next, while monitoring the photo-electric output waveform from the light-receiving system 18, the light-source support member 20 is moved in the circumferential direction of the shaft 13. The light-source support member 29 is then fixed to the flange 11 by means of the bolts 26 at the position of the optimal photoelectric output.

The fitting face 24 of the flange 11 and the fitting face 21 of the light-source supporting member 20 are formed by a cylindrical forming process, so the forming precision can be easily ensured. Further, the positional adjustment of the light-emitting diodes 23 can be performed only by moving the light-source support member 20 in the circumferential direction of the shaft 13, so adjustment can be easily performed by set amounts. Therefore, the assembly work for the rotary encoder and the positional adjustment work for the light-emitting diodes 23 can be easily automated.

Figure 3:
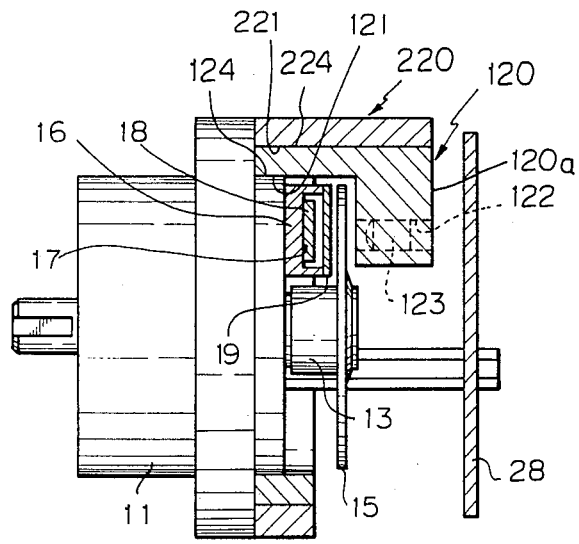
FIG. 3 is a longitudinal sectional view of an optical rotary encoder illustrating a second embodiment according to the present invention.
Figure 4:
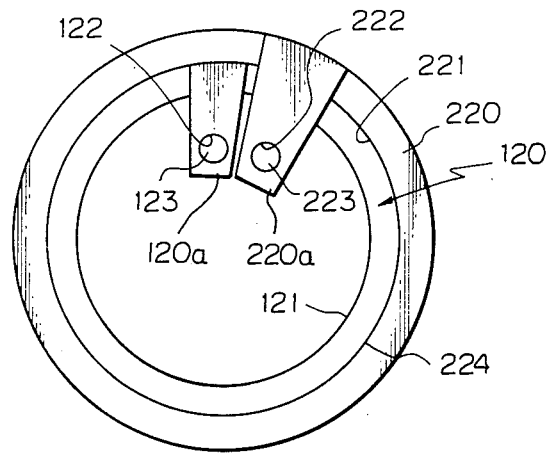
FIG. 4 is a front view of a light-source support member in the encoder shown in FIG. 3.

FIGS. 3 and 4 show a second embodiment of the present invention. In these Figures, constituent elements the same as in the above-mentioned embodiment bear the same reference numerals. Referring to these Figures, the optical rotary encoder comprises an inner light-source support member 120 and an outer light-source support member 220. The light-source support members 120 and 220 have arm portions 120a and 220a, respectively, extending inward in the radial direction. The arm portions 120a and 220a are provided with fitting holes 122 and 222. A pair of light-emitting elements 123 and 223 as a light source are fitted into and fixed to the fitting holes 122 and 222. Although not shown, the light-receiving system is provided with a pair of photoelectric conversion elements opposed to the pair of light-emitting diodes 123 and 223, respectively.

The light-source support members 120 and 220 have inner fitting faces 121 and 221. The flange 11 is provided with a fitting face 124 arranged coaxially with the bearing bore (not shown) and fittable to the fitting face 221 of the outer light-source support member 120. The inner light-source support member 120 is provided at the outside thereof with a fitting face 224 arranged coaxially with the inner fitting face 121 and fittable to the fitting face 221 of the outer light-source support member 220.

In this embodiment, it is possible to perform the positional adjustment of the inner light-source support member 120 and outer light-source support member 220 independently, so the adjustment of the photoelectric output having two phases from the light-receiving system can be performed independently, and the adjustment of the phase relationship (for example, 90 degrees) of the two phases can be performed precisely. Therefore, according to this embodiment, it is possible to easily ensure the high phase-accuracy in the two phases particularly required in the high resolution optical rotary encoder.

Figure 5:
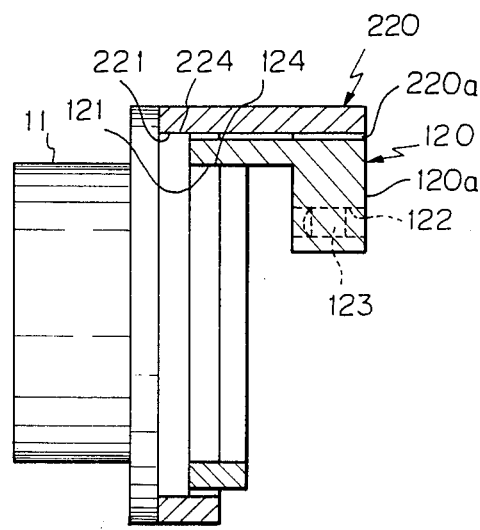
FIG. 5 is a partial sectional side view of an optical rotary encoder illustrating a third embodiment according to the present invention.

FIG. 5 shows a third embodiment of the present invention. The optical rotary encoder according to this embodiment is the same as that of the above-mentioned second embodiment except that the fitting face 224 fittable to the inner fitting face 221 of the outer light-source support member 220 is provided on the flange 11. Since it is possible to use the bearing bore of the flange 11 as a reference surface in order to form the fitting face 224, it is possible to prevent any decrease of accuracy upon the accumulation of the dimensional tolerances, in comparison to the second embodiment.

Although the foregoing explanation has been made in reference to the illustrated embodiments, the present invention is not limited to the above-mentioned embodiments but can be embodied in various forms without departing from the scope of the present invention as defined by the claims.

For example, it is sufficient that the light-source support member be rotatable about the axis of the shaft, so it can be formed as a part of the ring to obtain a lightweight. Further, the light source may include a light-emitting element such as an optical fiber lens.

CAPABILITY OF EXPLOITATION IN INDUSTRY

The present invention can be effectively applied particularly to high resolution optical rotary encoders.

I claim:

1. An optical rotary encoder for converting a rotational angle of a shaft rotatably supported on an axis in a base member into an output of an electrical digital quantity, comprising:
    a light-receiving system having a light receiving surface fixed to said base member;
    a stationary encoding plate fixed to said base member so as to face said light-receiving surface of said light-receiving system;
    a rotary encoding plate fixed to said shaft so as to oppose said stationary encoding plate;
    a light-source support member fitting to said base member for movement rotatably about the axis of said shaft with respect to said base member and said light-receiving system;
    a light-source attached to the light-source support member so as to be in opposition to said rotary encoding plate, said light-source being adjustably positionable with respect to said light-receiving system by rotation of said light-source support member on said base member; and
    a fixing means for fixing said light-source support member to said base member to maintain said light source in an adjusted position.

2. A rotary encoder according to claim 1, wherein said light-receiving system includes at least a pair of light-detecting elements arranged in the circumferential direction of the shaft and spaced from each other at a predetermined distance, and said light source includes at least a pair of light-emitting elements, one of said light-emitting elements being opposed to each of said light-detecting elements.

3. A rotary encoder according to claim 2, wherein said pair of light-emitting elements are spaced from each other in the axial direction of said shaft and each light-emitting is fixed to said light-source support member.

4. A rotary encoder according to claim 1 or 3 wherein said light-source support member has a inner cylindrical fitting face, and said base member has at the outside thereof an outer cylindrical fitting face fitable to the inner fitting face of the light-source support member.

5. A rotary encoder according to claim 2, wherein said pair of light-emitting elements are each fixed to one of a pair of light source support members forming an inner-outer double ring structure, respectively, said light-source support members each being rotatable independently about the axis of said shaft.

6. A rotary encoder according to claim 5, wherein said inner and outer light-source support members have at the inside thereof fitting faces, respectively, and said base member has a fitting face fitable to the inner fitting face of said inner light-source support member which, in turn, has fitting face fitable to the inner fitting face of said outer light-source support member.

7. A rotary encoder according to claim 5, wherein said inner and outer light-source support members have at the inside thereof inner cylindrical fitting faces, respectively, and said base member has two fitting faces fittable to the inner fitting faces of said inner and outer light-source support members, respectively.

8. A rotary encoder according to claim 1, wherein said light source includes a light-emitting diode as a light-emitting element, and said light-receiving system includes a photodiode as a photoelectric conversion element.

* * * * *